US007093012B2

(12) United States Patent
Olstad et al.

(10) Patent No.: US 7,093,012 B2
(45) Date of Patent: Aug. 15, 2006

(54) SYSTEM AND METHOD FOR ENHANCING CRAWLING BY EXTRACTING REQUESTS FOR WEBPAGES IN AN INFORMATION FLOW

(75) Inventors: Bjørn Olstad, Stathelle (NO); Knut Magne Risvik, Trondheim (NO)

(73) Assignee: Overture Services, Inc., Pasadena, CA (US)

( * ) Notice: Subject to any disclaimer, the term of this patent is extended or adjusted under 35 U.S.C. 154(b) by 774 days.

(21) Appl. No.: 09/950,883

(22) Filed: Sep. 13, 2001

(65) Prior Publication Data

US 2002/0032772 A1    Mar. 14, 2002

(30) Foreign Application Priority Data

Sep. 14, 2000    (NO)    ................................. 20004595

(51) Int. Cl.
*G06F 15/173* (2006.01)
(52) U.S. Cl. ........................ 709/224; 709/202; 709/220
(58) Field of Classification Search ........ 709/201–203, 709/220–224; 370/229–231, 254, 338
See application file for complete search history.

(56) References Cited

U.S. PATENT DOCUMENTS

| | | | | |
|---|---|---|---|---|
| 5,557,748 A | * | 9/1996 | Norris | 709/220 |
| 5,855,020 A | | 12/1998 | Kirsch | 709/203 |
| 6,038,668 A | | 3/2000 | Chipman et al. | 713/201 |
| 6,094,649 A | | 7/2000 | Bowen et al. | 707/3 |
| 6,101,491 A | | 8/2000 | Woods | 707/3 |
| 6,292,475 B1 | * | 9/2001 | Swail | 370/329 |
| 6,430,595 B1 | * | 8/2002 | Ferguson et al. | 709/224 |

OTHER PUBLICATIONS

S. Brin et al., "The Anatomy of a Large-Scale Hypertextual Web Search Engine", Proceedings of the 7th International World Wide Web Conference, pp. 107-117, Brisbane, Australia, Apr. 1998.
J. M. Kleinberg, "Authoritative sources in a Hyperlinked Environment", Journal of the ACM, Vo. 46, No. 5, Sep. 1999, pp. 604-632.
D. Gibson et al., "Inferring Web Communities from Link Topology", Hypertext, , Jun. 1998, pp. 225-234.

* cited by examiner

*Primary Examiner*—Bharat Barot
(74) *Attorney, Agent, or Firm*—Brown, Raysman, Millstien, Felder & Steiner, LLP

(57) ABSTRACT

A method for providing searching and alerting capabilities in traffic content at access points in data networks is disclosed. Typical access points for Internet, intranet and wireless traffic are described. Traffic flow through an Internet Service Provider is used as a preferred embodiment to exemplify the data traffic used as the input source in the invention. The invention teaches how proper privacy and content filters can be applied to the traffic source. The filtered data stream from the traffic flow can be used to improve the quality of existing searching and alerting services. The invention also teaches how a cache can be developed optimized for holding fresh searchable information captured in the traffic flow. It is further disclosed how the said cache can be converted to a searchable index and either separately or in cooperation with external search indexes be used as a basis for improved search services. The invention also discloses how the traffic flow can be analyzed in order to derive added information for measuring document relevance, access similarity between documents, personalized ranking of search results, and regional differences in document accesses.

26 Claims, 6 Drawing Sheets

Figure 1:
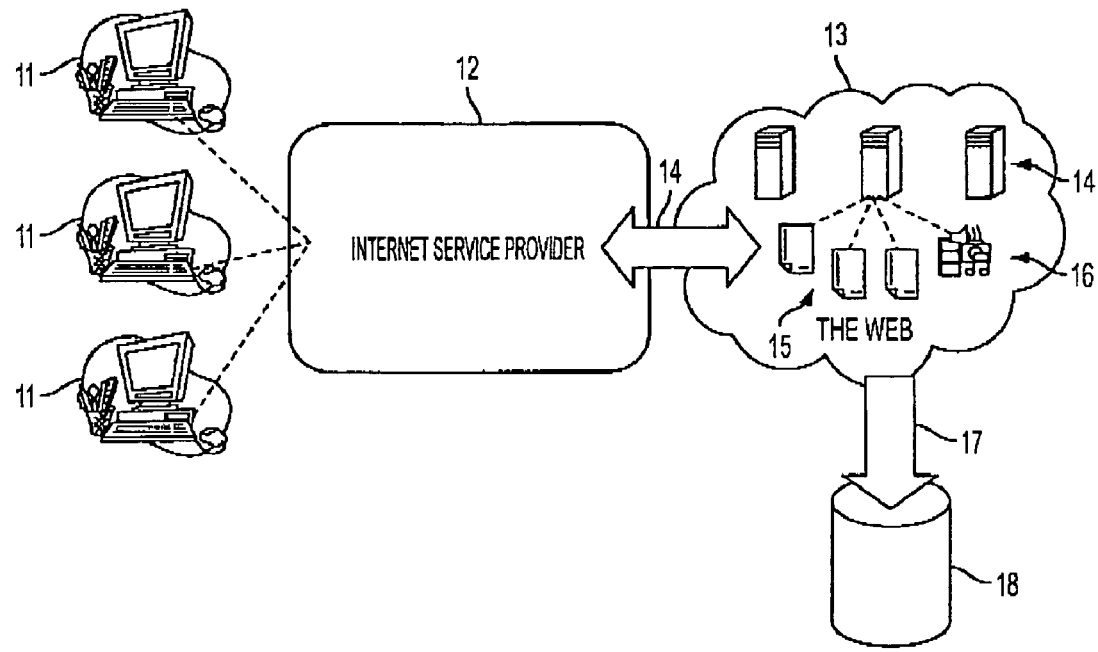

SYSTEM AND METHOD FOR ENHANCING CRAWLING BY EXTRACTING REQUESTS FOR WEBPAGES IN AN INFORMATION FLOW

The present invention concerns a method for searching and analysing the traffic content at access points in data networks, wherein the data networks are shared network resources, particularly the complete Internet or an intranet, wherein said access points particularly are Internet access points for users served by an Internet service provider, or distributed in the form of an application to a plurality of users, or a connection point for wireless users, said connection point being either a native connection point or an Internet gateway for multiple connection points.

The invention relates to improved information-retrieval methods and systems. In particular, the present invention relates to information-retrieval methods and systems accessing information on Internet or intranets through wired or wireless interfaces. Still more particularly, the present invention relates to intranet and Internet-based search engines and alert services.

Electronic information resources are growing rapidly on both Internet and closed intranets. This type of electronic information is increasingly displacing more conventional information sources, such as newspapers, magazines, and even television. The size of these information databases is currently growing almost exponentially.

Relevant general background art can be found in the following publications:

S. Brin and L. Page., The anatomy of a large-scale hypertextual web search engine, *Proceedings of the 7th International World Wide Web Conference*, pp. 107–117, Brisbane, Australia, April 1998 (Elsevier Science); J. M. Kleinberg, Authoritative sources in a hyperlinked environment, *Proceedings of ACM-SIAM Symposium on Discrete Algorithms*, pp. 668–677, January 1998; and D. Gibson, J. M. Kleinberg, and P. Raghavan, Inferring Web communities from link topology, *Hypertext*, pp. 225–234, Pittsburgh, Pa., June 1998.

A protocol such as the Hypertext-Transfer Protocol (HTTP), the File-Transfer Protocol (FTP) or the Wireless Application Protocol (WAP) is often used to transfer the content between the content providers and clients. Search engine technologies have been developed for both Internet and intranet applications. Currently, these search engines are based on automated crawling of web pages and additional online content from accessible servers. Typically, a set of seed pages is used to initiate the crawling. In a second phase the crawler also fetches documents that are referred to in one of the initial seed pages. This process continues as long as the crawler has detected new, unvisited document referrals in one of the fetched documents. Web documents are often formatted in Hypertext Markup Language (HTML). A document referral is in this case typically a HTML hyperlink to another web page. The web page itself is usually specified by an address such as the Universal Resource Locator (URL).

Currently, search engines usually works in two phases. First, a crawler is used to collect a document database. Once the documents have been collected, they are pre-processed and indexed in order to make them available for searching. The document collection principle for a crawler suffers from the following limitations or disadvantages that affect the quality of the subsequent search:

The crawler will only get access to documents in the transitive closure of the selected seed pages based on the document referrals. A crawler will for instance never visit the documents that are without any referring documents. Also documents that do have referring documents can be left unvisited by the crawler depending on the link topology and the selected seed pages.

Crawlers are restricted to relatively seldom access any given server. Typically, the crawler must wait 30 seconds or longer between two accesses to the same server. This limitation is due to robot rules that are made to protect servers from being overloaded with automated requests. Continuous crawling of a given site will hence be limited to about 3 thousand documents per day. There exist several large sites with so many documents that it is in practice impossible to download and index the complete content with the crawling principles in prior art. Even moderate sites pose a big problem in terms of freshness for prior art crawling principles. A site with 90 thousand documents will for instance require a months crawling for a complete update.

Prior art principles for crawling are not well suited for guaranteeing freshness of the collected documents. The crawling restrictions make complete site updates in a search engine impossible for some sites and a matter of weeks or months for others. Only sites with less than about 3 thousand documents can be completely updated daily. The lack of freshness is a severe limitation of the potential for search engines. It is a huge market for daily newspapers, but the market for reading or even searching old newspapers is virtually nonexistent. Similarly, it should be expected that it would be of general interest to have access through search and alert services to web content that has been recently updated.

Prior art principles for crawling is not capable of retrieving dynamic objects. Dynamic objects are objects that typically require parameters passed along with the HTTP request. A user can for example make a few selections in dialog boxes, check boxes etc. and download a page that is not stored permanently as a html file, but rather generated automatically based on the user selections. Guessing all possible parameter settings is virtually impossible for a crawler and dynamic objects are therefore currently not accessible through Internet search engines. The web is on the other hand becoming more and more dominated by dynamic content both in terms of the number of pages and in terms of the value of the information or service.

The document databases for both Internet and many intranets are growing almost exponentially. However, the query complexity remains almost unchanged. The number of matching documents for a given question is therefore also growing almost exponentially. The relevancy challenge for search engines is therefore becoming more and more important. Prior art techniques for crawling allow for analysis of the link topology between documents and various techniques for assigning document priority based on this topology have been proposed. Link topology is on the other hand not an adequate source for relevancy for important document classes like: dynamic objects, new documents, binary files and wireless pages like pages written in the Wireless Markup Language (WML). All of these examples have none or relatively few links that can be used for a link topology analysis.

Alert services are described in prior art and work in much the same way as a search engine. An alert service will typically be able to take a search engine query and check a stream of new information against the query. A user can for instance search historic data on a search engine and use the query as a trigger in an alert service that is applying the query to a stream of new documents.

Due to the weaknesses and disadvantages inherent in the prior art and discussed above, there exist a pressing need for improving the document collection process in search and alert services.

A primary object of the present invention is hence to provide a method that will allow an increase in the total number of documents that can be collected, and an increase in the percentage of documents that can be collected from large sites, as well as improving the freshness of the documents in terms of the delay between the last document update or document creation and the time when it is searchable in a search service, in addition to allow the detection of documents that becomes invalid ("dead" links) and the collection of dynamic objects.

It is another object of the invention to leverage the improved source of recently updated documents to create alert services by checking whether a new document matches the triggers defined by the users of the alert service.

It is yet another object of the invention to let the relevancy or ranking criterion in the search engine to be based on the age of the document. This is particular important because this invention describes improved document collection principles that will allow the user to for instance search in new web documents created or updated the last 10 minutes, last hour or last day.

It is a further object of the invention to use the request statistics at access points in data networks to build improved relevancy in search and alert services.

It is yet a further object of the invention to create location specific document ranking by using request statistics from users in a spatial neighbourhood.

Finally it is also an object of the invention to use temporal proximity in request statistics to define degrees of similarity between documents.

The above objects and other features and advantages are realized according to the method of the present invention which is characterized by comprising steps for collecting information in the form of data extracted from the information flow at said access points in the data network, indexing said collected information with a predefined maximum time delay, and searching and retrieving information from said indexed information, and by further optional steps based on an analysis of the traffic content at access points for location coding of collected information in the form of documents, measuring the similarity of documents, and alerting users in regard of new and updated information.

Additional features and advantages of the present invention are disclosed by the appended dependent claims 2–36.

Figure 2:
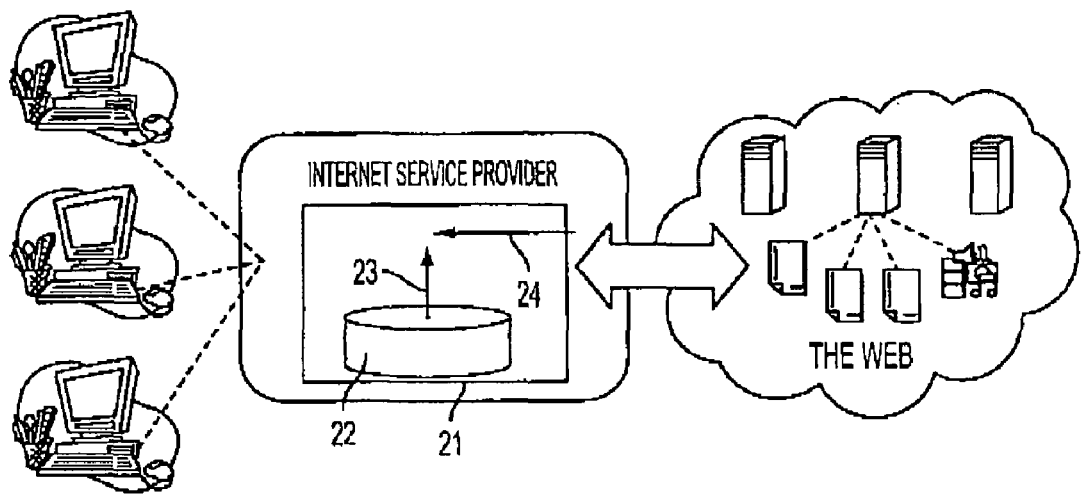
Figure 3:
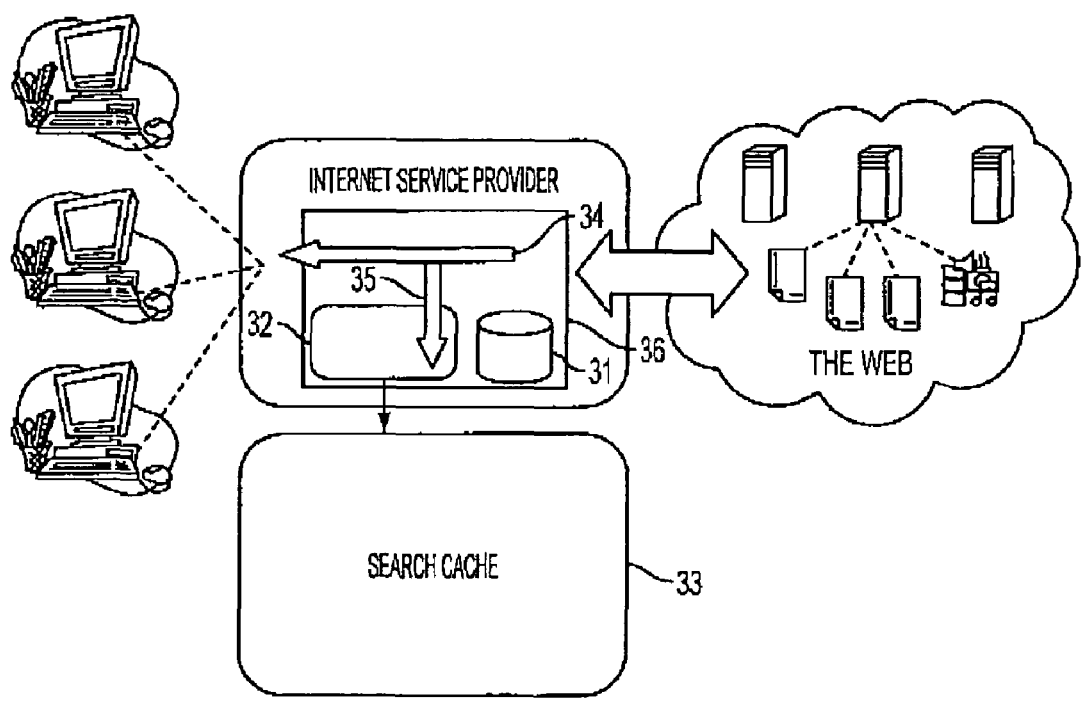
Figure 3B:
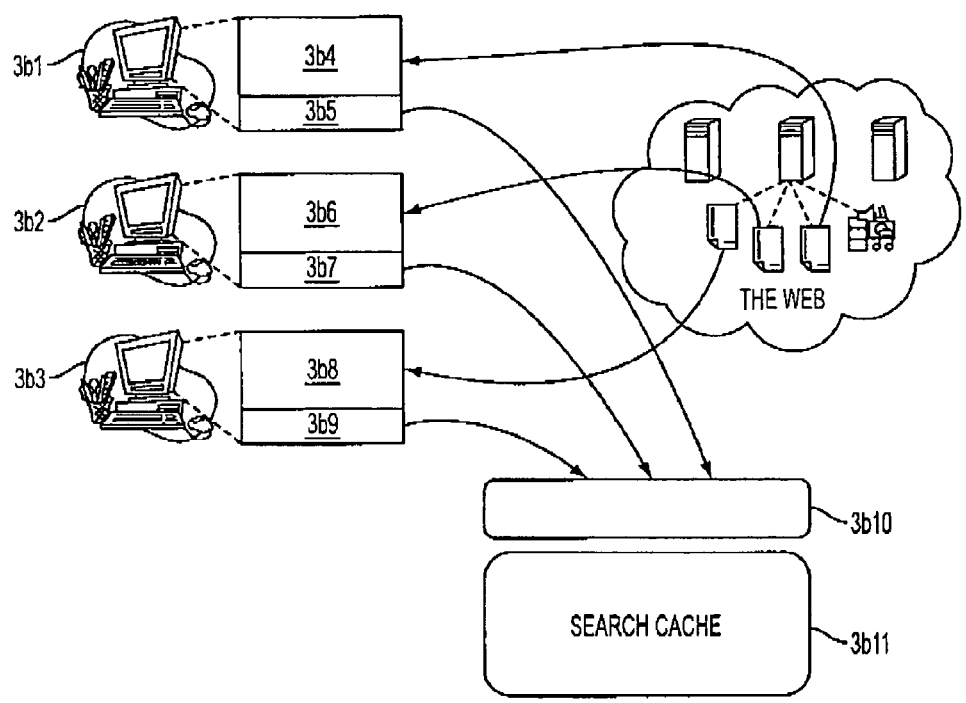
Figure 4:
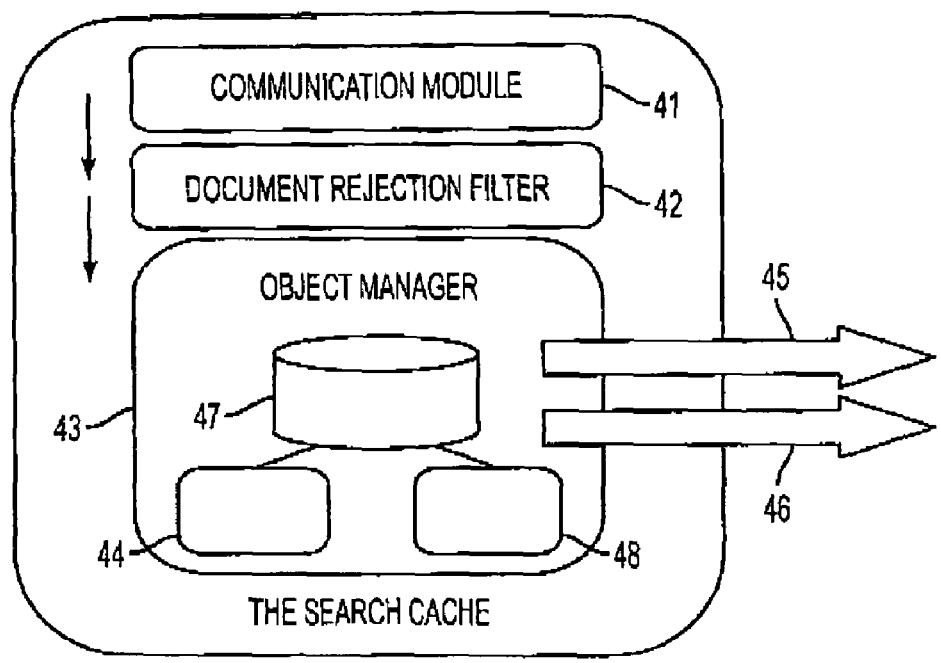
Figure 5:
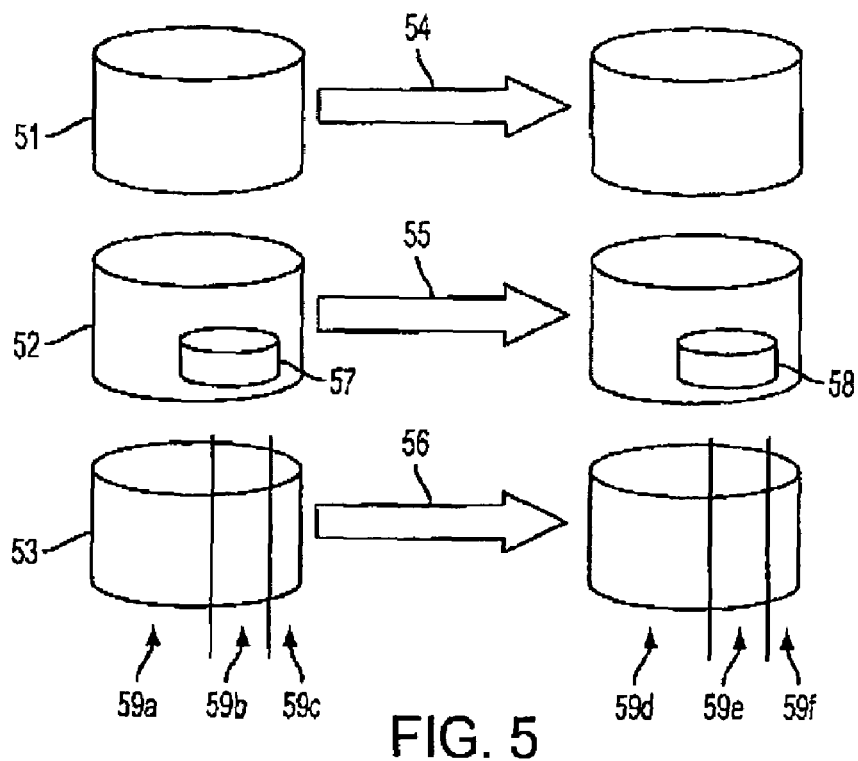
Figure 6:
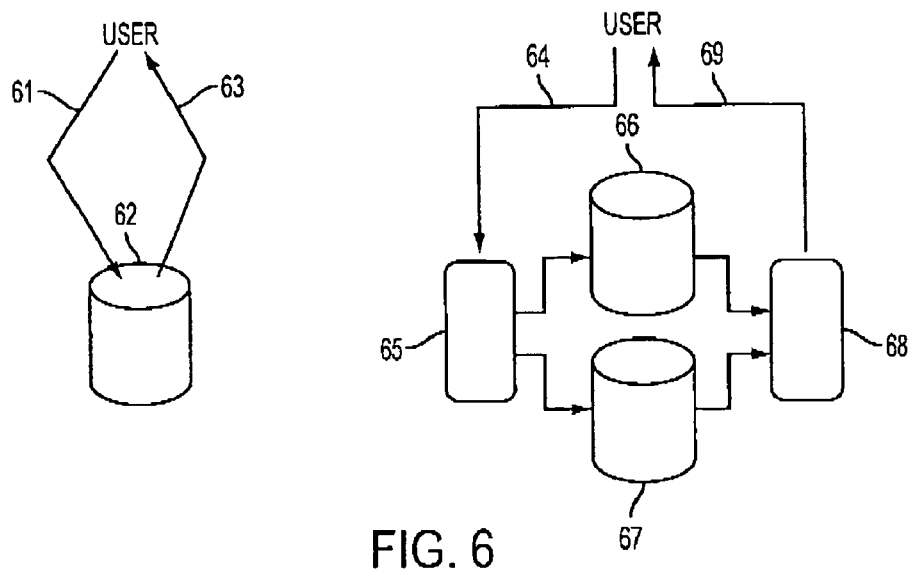
Figure 7:
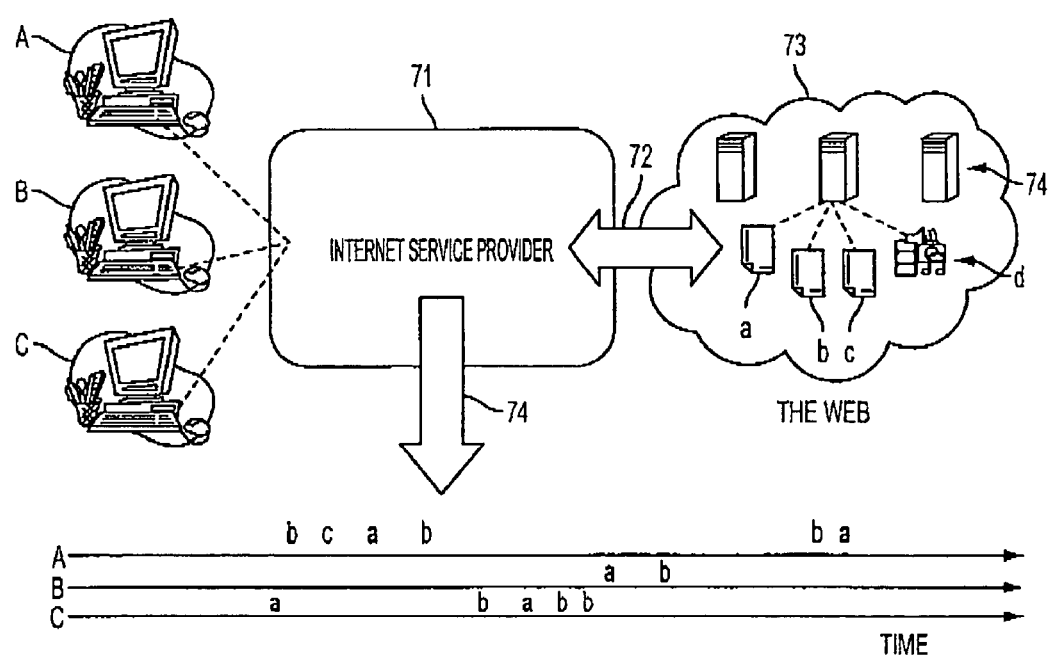
Figure 8:
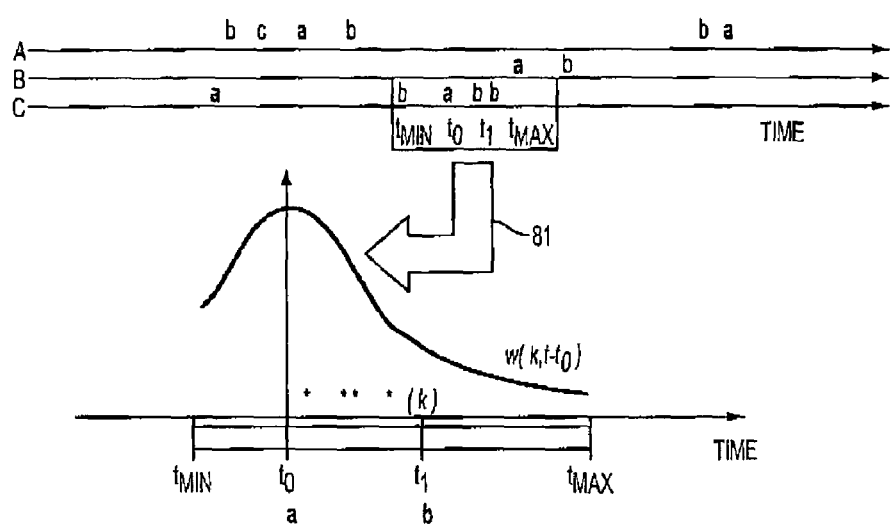

The invention itself, as well as the preferred embodiments, shall be better understood by reference to the following detailed description of preferred and illustrative embodiments when read in conjunction with the accompanying drawings, wherein FIG. 1 shows client connection to Internet through an ISP, FIG. 2 a proxy server at the ISP, which is caching web content, FIG. 3 a proxy server modified to communicate with an external search cache, FIG. 3*b* distributed traffic crawling from client software, FIG. 4 a possible organization of the search cache, FIG. 5 how the content of the search cache can be turned into a search index, FIG. 6 configurations for a search service utilizing the search cache index, FIG. 7 the temporal proximity principle for defining document similarity, and FIG. 8 a possible definition for a weight function defining the temporal vicinity.

Before a detailed discussion of preferred embodiments is given, the general background of the present invention shall briefly be discussed to ease the understanding of the latter.

Internet users are often connected to the net through so-called Internet Service Providers (ISPs). FIG. 1 illustrates how clients connect via an ISP to the various web servers. The ISP (12) leases bandwidth from an Internet backbone provider, and offers end-users (11) to have "a stake" of the bandwidth (14) based on a time-sharing model. The accesses from the endusers (11) are in this way routed through the ISP (12) to the web (13) with the individual servers (14) hosting documents (15) and multi-media content (16). The same model also applies for wireless users, either through native connection points or through Internet gateways for multiple connection points. Search engines in prior art have been based on automated crawling (17) from the web servers (14) and structuring this information in a search index (18) that is made available for searching. Results from the searches provide references back to the original documents on the web (15,16).

A common concept in computer systems is caching systems. The ISPs often employs a web-cache at their bandwidth distribution unit. This cache reduces the bandwidth usage on the backbone, whilst the end-users will experience lower latencies. Web-caches are often employed through proxy servers. Proxy servers can be transparent or non-transparent. Several caching mechanisms and proxy servers exist in prior art. One example is Squid (www.squid-cache.org), which is a free software version of a web proxy. FIG. 2 illustrates how the proxy server (21) might have an internal collection of documents or objects (22). User requests to these objects are served locally (23) in order to reduce the external bandwidth requirements from the ISP (24). The users will also experience reduced latency when a cached document or object is accessed. Expire rules are defined for the individual objects in order to assure that a copy in the cache actually reflects the original object.

The concept and properties of so-called traffic crawling shall now be discussed.

The complete set of users connected to Internet through an ISP will in total act as a large crawler of information from the web. For the remainder of this invention refer to this total information collection at an ISP or a similar connection point or gateway will be referred to as a traffic crawler. This "human" traffic crawler has a number of properties that are very different from an automated software crawler:

The traffic crawler will not have the same limitations as a software crawler in terms of seed pages and link topology for getting access to documents.

The traffic crawler will not be limited by the access limitations to a given site that a software crawler is subjected to. The traffic crawler can therefore potentially crawl large sites much faster and more complete.

A software crawler will spend much of its time by simply downloading documents it has visited before and checking if the content of these pages has been updated since the last download. The traffic crawler can check the content being retrieved by the ISP for the user requests to do duplicate testing against previous copies of the corresponding document. No additional information downloading is therefore necessary.

The traffic crawler can add to the freshness provided by a software crawler in two ways:

The traffic crawler detects missing or temporarily unavailable documents. The detection could typically be done by recording when a HTTP request to a given URL results in an error message such as error number 404. These failed requests could be utilized in the associated search service by either removing the associated URL's or assigning a lower rank value to the URL for the sorting of documents in the result lists produced by the search engine.

The traffic crawler can potentially analyse a new or updated document as soon as one of the connected ISP clients have downloaded the document. For instance a new press release could in this way be made searchable as soon as one of the ISP clients has read the article.

The ISP users will access dynamic pages and the content of these pages can hence also be made searchable. It can often be a virtually infinite number of parameter combinations that can be used to generate a dynamic page. The parameter combinations actually used in the requests are therefore a very reasonable selection for defining the set of dynamic pages that should be made searchable. This is exactly the set of dynamic pages that the traffic crawler potentially can index for subsequent searching.

The access pattern of the ISP users can also add to improved relevancy in the associated search index. Sites that are frequently visited can be ranked higher than the sites that are seldom visited. Such access counting could potentially also be done by the search engine itself by redirecting the user selections in the result lists, but it is much more valuable to base the relevancy computation on the total access pattern and not only the access pattern that comes as a result of searches.

The implementation and design of traffic crawling shall now be discussed, based on respectively a centralized or a distributed crawling concept.

Centralized Traffic Crawling

There are several ways to implement a traffic crawler based on the traffic at an access point in data networks. This invention will teach a few possible embodiments and it will be obvious to someone skilled in the art how slightly different design choices can be utilized to realize the same benefits. The examples taught in this invention will use traffic at an ISP an indexing of web documents as a case, but it will be obvious to someone skilled in the art how the same principles can be applied in similar situations such as intranet traffic or wireless connection points.

The actual access to the documents or objects passing through an ISP can be done in various ways. One alternative is to utilize the caching mechanisms employed by the ISP. The content of this cache can either periodically be indexed for searching and alerting or the search index could be augmented incrementally each time a new document or object is stored in the web cache. The limitation with this approach is that current web caches are designed to reduce the external bandwidth requirements from the ISP. The bandwidth goal dictates to a large extent what kind of objects that are kept in the web cache. Typically, a large fraction of the web cache will consist of frequently accessed multimedia objects. A lot of the most interesting text pages for indexing will also have an expire tag defined that tells the web cache to exclude it from the cache.

Hence, optimising the quality of the traffic crawling will either require modification of the web caching policies or a separate cache must be deployed in parallel with the web cache. The web cache will in this case select objects based on bandwidth optimisation criteria and the search cache will select objects based on document quality in terms of searching and alerting services.

FIG. 3 illustrates how a proxy server can be modified to communicate with a co-operating search cache. The search cache can either reside on the same computer(s) as the proxy server or it can reside on different computer(s) and communicate via a data network. The proxy server contains and internal web cache (31) which is used to reduce the external bandwidth requirements. The internal web cache is not necessary to implement the traffic crawling. A communication module (32) is included in the proxy server. The communication modules records web requests (35) passing through the proxy server (34) and optionally records and buffers result messages for the requests and the actual content, which is delivered to the user as a result of the request. The communication module transfers (36) part of this information to the search cache (33). The information transferred can be set up to include:

Only requests: This can be implemented by periodically transferring the updates in the access log of the proxy server from the communication module (32) to the search cache (33). Each access record can optionally be tagged with information like:

User information such as the IP address.

Encrypted user information. Due to privacy issues in web applications it will normally be important to keep the anonymity of the individual users. The communication module inside the proxy server can therefore be set up such that either all personal information is excluded or coded such that individual users can be separated but not identified based on the data that enters the search cache. One example could be to tag the request with an encrypted number based on the users session ID. This approach also makes the privacy policies controllable by the ISP and internally in the ISP proxy software.

Associated user information such as country and city. This information might be kept at a sufficiently coarse level to guarantee that individual users cannot be identified based on the data that enters the search cache. The location information can be generated based on auxiliary data recorded by the ISP when the individual users establish an account. Wireless applications can obtain localization information from for instance GPS-data provided by the wireless device or through localization of phones based on for instance base station IDs and delay times.

The result code for the web request. The search cache can for instance use this information to remove dead links or lower the rank of links that often are temporarily unavailable.

Hash values for document content. The communication module (32) can compute one or multiple hash values that reflect the content returned to the user as a result of the request. Such content keys can be computed with a minimal CPU overhead and represent a very compact way to transfer information to possibly a remote search cache. A remote search cache can for instance use this information to compare it with historic hash values for the same document. Changes in the hash values indicate that the document has been updated and it should be re-crawled in order to update the search index.

Requests with content: The communication module (32) can also send the actual document content in addition to the information discussed above for the request itself. This option is typically selected if a high capacity data channel is available between the communication module (32) and the search cache (33). The document has been retrieved by the ISP and can therefore in this way be made available for indexing and alerting without any additional requests to the original web server. The data stream must in this case be split such that a copy of the information returned to the user is being transferred from the communication module (32) to the search cache (33). It can be advantageous to perform some filtering in the communication module (32) in order to reduce the communication to the search cache (33). Typically, only requests that are interesting to index could be transferred. Examples of such filtering rules include:

Only transfer HTTP GET requests

Only transfer requests for the MIME types text/*

Only transfer content for requests with a result code indicating successful transmission Only transfer requests for either positively identified hosts or for hosts that are not in a database of identified hosts that should be excluded.

The search cache (33) receives the information stream from the communication module (32) inside the proxy server and utilizes this information to build a search index or an alert service. FIG. 4 shows a possible organization of the search cache. The search cache (33) includes a communication module (41) that handles the data transfer with the communication module (32) inside the proxy server. The actual transfer logic can for instance be implemented with sockets. The data received by the communication module (41) is sent for further processing. The first processing step is optionally a rejection logic filter (42) that can extend and add to the filtering mechanisms described for the communication module inside the proxy server. The benefit of doing rejection filtering inside the proxy server is that the data bandwidth between the proxy server and the search cache is reduced. It is on the other hand also advantages of doing some of the rejection filtering inside the search cache:

The load additions for the CPU running the proxy server should be made minimal. The processing overhead inside the communication module (32) should therefore be kept to a minimum.

The search cache will typically have fast access to document information that is important for designing good rejection filters. Such information includes for instance historic hash values for document content, access statistics, and databases with hosts or sites that should be rejected.

It should be noted that the rejection logic (42) could be performed in real-time during the actual transfer. The transfer can hence be stopped as soon as the stream has been identified as an object that should be rejected by the search cache.

Distributed Traffic Crawling

FIG. 3b shows distributed traffic crawling from client software. A set of users (3b1, 3b2, 3b3) retrieves documents from a shared network resource such as Internet, mobile Internet or intranets. The documents are retrieved and displayed inside client software (3b4, 3b6, 3b8). The client software can typically be a browser application. A communication module (3b5, 3b7, 3b8) can be located either internally in the client software, as a plug-in or as a cooperating module. The communication module can when it is activated record the document ID's such as the URL's of the documents retrieved by the client software. The communication modules can furthermore send the same type of information as previously described for centralized traffic crawling. The messages from the distributed set of communication modules inside the client software are aggregated by a server application (3b10). The server application (3b10) communicates the acquired information to a search cache (3b11) in exactly the same manner as the communication module in centralized traffic crawling (32) sends information to the search cache (33).

Distributed traffic crawling makes it possible to obtain the same benefits as centralized traffic crawling without the need to integrate the system with ISP's or similar services. A distributed access point is in stead utilized through client software and the distributed access information is aggregated by communication over the net to a centralized server application.

Handling of private information can easily be handled in distributed traffic crawling since the user can through the client software explicitly activate and deactivate the communication module.

The caching of traffic content shall now be discussed.

The documents that are not rejected by the rejection logic filter (42) are transferred to an object manager (43) that actually caches the information associated with the various documents. The object manager includes a privacy filter (44) that checks the documents in the temporary storage (47) such that private information is excluded from the output from the object manager (43). The privacy filter (44) will be described separately in the invention. The information stored together with the document reference in the object manager (43) can include:

Information attached to the document by the communication module (32) inside the proxy server as previously described.

Document statistic like the last-modified attribute.

Access statistic like time of first-seen, time of last-seen, number of accesses in various time intervals, and the number of different users that have accessed the document.

The document content itself.

A static rank value for the document.

The object manager can either serve as a service that continuously or periodically outputs data streams with information about new, updated or deleted documents. The data streams can either only include document references (45) or document references including the actual document content (46). These data sources are valuable for building alert services for web updates and for improving the size, freshness and relevance of general and specialized search engines on the web. The document references (45) can be used as a re-indexing signal to guide the crawler (17) of a traditional search engine and the actual document content (46) can be used to also replace the crawling (17) of these documents in a traditional search engine.

The object manager (43) can also serve as a cache by increasing the temporary storage and including eviction algorithms for removal of documents from the cache. The time-to-live attribute that can be assigned to documents for instruction of web caching is not really relevant for search caching. The actual document accessed by the user in the resulting search service will be to the original document. The only risk is hence the traditional problem for search engines that the indexed text might be outdated compared with the actual document. The likelihood of this freshness problem is on the other hand dramatically reduced by search services built on the techniques taught in this invention. The cache eviction policies could be tied closely with the document rank value if this value truly reflects the documents quality and/or popularity. New or updated documents could be kept in the cache for some predefined minimum time such that search services can be built for recent web updates. Dynamic objects could have reduced time-to-live in the search cache in order to avoid an excessive amount of dynamic objects that usually are frequently updated.

The object manager (43) could also include a module for computing static rank values (48) for the documents in the temporary storage (47). The rank value can be used both for the caching policies in terms of determining which documents that should be removed from the temporary storage (47) and as input for the ranking of search results in the resulting search service. The ranking criterion can typically be a combination of link topology, document content and access pattern. The benefit of the traffic crawler is that the quality of the estimates on access statistics will be improved over prior art. An example of a simple ranking formula limited to the access statistics is:

$$r'=r+w \cdot I \cdot f(\text{hit rate}) \cdot g(\text{number of users accessing document})+(I-A)$$

In this equation r denotes the previous rank of the document and r' denotes the updated rank of the document. w is a weighting factor in the recursive update of the ranking value. I denotes the target average rank value and could also be used as an initial value for new documents. A denotes the average rank in the previous ranking and is used to stabilize the rank values over time based on I. The functions f and g are monotonic functions that increase the weight of the documents that are accessed often and by many different users.

The indexing of the traffic cache shall now briefly be explained

The object manager can be used simply to continuously or periodically output data streams with information about new, updated or deleted documents (45 and 46). The recipient of the generated data streams will in this case handle the indexing of this information and the resulting search service generation. Another alternative is to let the object manager (43) use a cache or a temporary storage (47) and either continuously or periodically index the content in the temporary storage (47).

FIG. 5 shows how the content of the search cache can be turned into a search index. The simplest approach (51) is to periodically process (54) the complete content of the search cache in order to construct an updated search index. Alternatively, the complete search cache can be indexed once and then and incremental index (58) is constructed continuously or periodically (55) for updates (57) in the search cache (52). The incremental index must either be directly combined with the complete index or periodically merged. The merging can also be implemented by simply re-indexing the complete search cache. Yet another alternative is to let the search cache divide the data into groups according to the last recorded document updates (53). The groups could for instance be "last hour" (59c), "last day" (59b), and "last week" (59a). The same groups would hence be reflected in the search index (59d, 59e, 59f). Such groups would reduce the indexing requirements and merging operations required for the indexes.

The document rank computed by the indexing operation can either utilize the rank value suggested by the rank computation (48) inside the object manager or it can combine this value with other sources of information such as link topology.

According to the present invention the traffic cache can advantageously be used in a search service.

FIG. 6 shows configurations for a search service utilizing the search cache index. The search index generated from the search cache is an index that can be utilized in a traditional way to build search engine services. The user sends the queries (61) to the search cache index (62) that produces results (63) that are returned to the user. The search engine can leverage the benefits provided by the traffic crawler that has been described in this invention.

Another alternative is to combine the search index generated from the search cache with an external search index that could for instance be a large-scale general Internet search service such as www.alltheweb.com. The users search query (64) would in this case be sent to a query dispatch module (65) and the same search would be conducted both in the traffic cache index (66) and the collaborating search index (67). The result lists produced by the two searches are merged in a merger module (68) that take the document ranking values into account. Finally, a unified result is constructed and returned to the user as a response to the initial query (69). The merging operation can hence select various algorithms for ranking the local content returned from the traffic cache index against the content from the collaborating search engine that might have globally ranked content.

The concept with two collaborating search engines can easily be extended to handle multiple search engines with potentially more than one traffic cache. The dispatch module (65) and the merger module (68) must in this case be modified to communicated with the selected set of search services. Similar combinations with parallel searches in multiple prior art search engines for the Internet exist in prior art and are usually referred to as meta-search engines.

The method of the invention shall advantageously enable the use of regional or community specific ranking.

The document databases for both Internet and many intranets are growing almost exponentially. However, the query complexity remains almost unchanged. The number of matching documents for a given question is therefore also growing almost exponentially. The relevancy challenge for search engines is therefore becoming more and more important. Location information can play a key role in implementing the necessary relevance improvements.

Location encoding can be achieved by studying the content and the properties of a given document. Information such as addresses or telephone numbers can be used to assign the document to a specific geographical location. Alternatively, one can study the access pattern to a given document from different regions and identify which documents that are statistically over represented in terms of accesses from a given region. The search engine can utilize this information to create region specific ranking formulas. A Spanish user of the search service could for instance have a ranking that utilizes information about which sites that are popular among Spanish users. The regional access pattern can also be used to create automated lists of popular documents that are associated with any specific region. These lists can be further divided into categories and can hence be used to create automated regional portal services.

The spatial information provided by the traffic crawler must be kept at a sufficiently coarse level to guarantee that individual users cannot be identified based on the data that enters the search cache. Typically, all regions annotated should have a predefined minimal number of users. The location information can be generated based on auxiliary data recorded by the ISP when the individual users establish an account. Wireless applications can obtain localization information from GPS-data provided by the wireless device or through localization of phones based on for instance base station IDs and delay times.

The method according to the present invention will advantageously be able to provide information, allowing computation of document similarity based on statistics provided by the traffic crawler.

Prior art techniques for crawling allow for analysis of the link topology between documents and various techniques for assigning document priority based on this topology have been proposed. Link topology is on the other hand not an adequate source for relevancy for important document classes like: dynamic objects, new documents, binary files and wireless pages like pages written in the Wireless Markup Language (WML). All of these examples have none or relatively few links that can be used for a link topology analysis. The temporal proximity in request statistics delivered by the traffic crawler can provided a useful source for defining similarity measurements between documents in these situations. The request statistics can also add to similarity measurements in situations where a richer link topology can be used for similarity measurements.

FIG. 7 illustrates the temporal proximity principle for defining document similarity. The ISP (71) connects (72) a number of users (A,B,C, . . . ) to the web resources (73) which consist of servers (74) and individual documents (a,b,c,d, . . . ). The access log recorded by the traffic crawler can be split on the various users such that subsequent requests from the same user can be identified (74). User privacy can still be maintained by encrypting the user ID information. It is sufficient for the following analysis that the access log is annotated with session IDs instead of user IDs. Annotation with session IDs or encrypted session IDs will further protect the users privacy.

The similarity definition rests on the assumption that an individual will dominantly retrieve related information within a short time window or within a short interval of successive requests. There are obviously exceptions to this assumption, but random changes caused by a switch of focus by the user can also be expected to have a more statistical random nature.

FIG. 8 shows a possible definition for a weight function defining the temporal vicinity. An example is illustrated where the user "C" makes a request to the document "a" at the time $t_0$. A second request by the same user or session is made to the document "b" at the time $t_1$. Also assume that k other document requests have been made by the same user between the requests to the documents "a" and "b". A vicinity weight function can in this case be defined as a function $w(k, t_1-t_0)$ where w is a function that decreases monotonically with both k and $|t_1-t_0|$. In simplified models w can be selected as a signature function of for instance a given time interval relative to $t_0$ ($t_{MIN}-t_{MAX}$) or a given number of accesses $k_1$ prior to $t_0$ and a given number of accesses $k_2$ after to. Similar weight function models are used in other applications such as algorithms for managing pages in a virtual memory.

A ranked similarity list for a given document "a" can now be established by measuring the statistical overrepresentation of other documents in the vicinity of requests to the "a" document. The analysis can either be performed on a document level or on a site level where all documents residing on a given site are treated simply as a request to the top-level site. The ranking value can be based on a number of techniques and it will be obvious to someone skilled in the art how slight modifications of the embodiments taught in this invention can be applied. The similarity rank can be based on for instance one of these measurements:

Total access number within a predefined time vicinity window of requests to the "a" document.

The total sum of the vicinity weight function w for all accesses within a predefined vicinity window of requests to the "a" document.

The statistical significance of the observed number of "b" requests within a predefined vicinity window of requests to the "a" document. The statistical test can be based on a null hypothesis that assumes that requests to the "a" and "b" documents are really unrelated. Furthermore, the general access frequency to the "a" and "b" documents can be taken into account in the statistical test. A similar statistical test can be devised by utilizing the total sum of the vicinity weight function w as the observation variable instead of the request count.

A document similarity list can hence be computed for any document "a" by sorting documents requested within a predefined vicinity window of requests to the "a" document according to one of the suggested similarity rank functions. The quality of such similarity lists can be improved by removing trivial similarities such as documents on the same site or documents that are directly referred to with hyperlinks in the "a" document.

The similarity lists can also be computed for a group of documents instead of a single document. This can easily be implemented by treating any request to a document in the document group as a reference to the "a" document in the previous description. Alternatively, one can improve the affinity by weighting the requests by a user similarity factor that for instance could count the number of common documents between the document group and each of the access logs for individual sessions.

Personalized ranking and document selection can be achieved in this manner by for instance computing a document similarity list based on a set of user-selected documents. The user can either select these documents explicitly or an automatic selection can be done based on favorite selections inside the browser or access history recorded either locally by the client's browser or at the access gateway.

Search services and alert services can utilize this information to allow the user to create a personalized ranking formula. The personalized ranking could favor the following documents in the result lists:

Documents actually supplied by the user.

New dynamic pages related to documents supplied by the user such as news articles on a newspaper site.

Documents that have high similarity factors as described above with the set of documents supplied by the user.

The present invention can also serve to establish relevancy algorithms on the basis of document similarity topology.

Modifying the definition of the predefined vicinity window for similarity ranking can derive interesting properties about the documents. It is for instance possible to compare the rank value between the two documents "a" and "b" with two vicinity windows: one 10 minutes after "a"-requests and one 10 minutes before "a"-requests. Differences in these two values will both give information on the relation between "a" and "b" and the nature of the content in "a". These values will actually define the real effective link topology between documents based on actual usage. The values can be compared with the hyperlink topology or replace the hyperlink topology as a basis for document relevancy computations. It will be obvious for someone skilled in the art how prior art techniques for relevancy based on link topology can be extended to the traffic derived usage topology taught in this invention. Two such alternatives are:

First, an initial document rank is assigned to each document. It can either be the same for all documents or take other information sources into account for differentiating the document. Secondly, document ranks are propagated through the described usage topology by weighting the initial document ranks with the link strength.

Algorithms found in prior art such as the page rank or HITS algorithm can be used as iterative models for propagating the page ranks through the described usage topology.

In most web and wireless applications of the current invention it will be paramount that the user privacy is maintained. Indexing of traffic content at access points in data network could potentially make private information searchable for a large audience. Hence the method according to present invention shall be able to assure user privacy.

Separate protocols have been devised that safely and securely transport web objects, for instance the HTTPS protocol. Web servers that host private content objects should use such protocols if they wish to guarantee discretion to the user. Unfortunately, rather the opposite is common practice. A variety of different ways are used to hide private content at the web servers, while the actual content is still transported as clear text. A lot of the private content is hosted as dynamic objects and has therefore in general not been available in prior art search services. The current invention teaches how dynamic objects also can be efficiently indexed and made searchable.

The following principles can be used to avoid indexing of private or sensitive information:

Secure protocols like the HTTPS protocol are obviously not indexed.

Indexing is limited to HTTP GET requests. Some personal objects are for instance retrieved by using a HTTP POST operation on the server. Results from these operations are not stored.

Sometimes dynamic and personal content is protected by some version of the HTTP authentication mechanisms. This works by setting specific fields in the HTTP request header. This type of authentication can be automatically detected in order to exclude the resulting information from indexing.

The indexing can be limited to documents that have been viewed by a predefined minimal number of users. Indexing of information that only a single user has been viewing can in this way be avoided.

The indexing can be limited to requests that don't contain cookies in order to assure that the cookie don't transport personal information that is required for retrieving the document.

The indexing can be limited to a predefined set of sites and hosts.

The indexing can exclude predefined sites and hosts that should not be indexed.

Detected document references can finally be re-crawled in order to check that the information is actually generally available for anybody.

While the present invention has been particularly shown as described with reference to a preferred embodiment, it will be understood by those skilled in the art that various changes in form and detail may be made therein without departing from the spirit and scope of the invention. Utilization of specific protocols and formats is not a necessary feature of the present invention. For example, other wireless protocols can replace WAP/WML without affecting the principles taught in this invention. It is therefore contemplated that such modifications can be made without departing from the spirit or scope of the present invention as defined in the appended claims.

What is claimed is:

1. A method for searching and analysing the traffic content at access points in data networks, wherein the data networks are shared network resources on the Internet, wherein the method comprises:

collecting information in the form of data extracted from the information flow at said access points in the data network, indexing said collected information, searching said indexed information, retrieving information based on the searching, storing collected information by caching in one or more cache means provided at one or more access points, processing the cached information repeatedly and generating an index thereof, and using the traffic content observed between two indexing operations on the cached information for generating a temporal search index with fresh traffic content since a last indexing operation performed of said cached information, and performing searching by combining searching in both said temporal search index and a most recent search index generated by indexing said cached information.

2. A method according to claim 1, further comprising limiting the indexing of the collected information to the subset of the traffic content that has not been discarded by a sensitivity filter, said sensitivity filter being adapted for detecting one or more of the following, pornographic material, private material, and material from http POST operations.

3. A method according to claim 1, wherein the searching step includes a substep for relevancy ranking or data filtering depending on a recorded time attribute of traffic content units, said recorded time attribute being one or more of the following-the creation time of a traffic content unit, a last time a traffic content unit is modified, a time of a first observation of a given traffic content unit at an access point, and a time of a last observation of the given traffic content unit at said access point.

4. A method according to claim 1, wherein the searching step includes a substep for relevancy ranking depending on access counting of individual traffic content units through an access point.

5. A method for searching and analysing the traffic content at access points in data networks, wherein the data networks are shared network resources on the Internet, wherein the method comprises:

collecting information in the form of data extracted from the information flow at said access points in the data network, indexing said collected information, searching said indexed information, and retrieving information based on the searching, wherein the searching step is implemented by at least one collaborating search engine, the searching step including substeps for dispatching search requests to said at least one collaborating search engine, collecting search result from a local traffic index, collecting search results from said at least one collaborating search engine and combining said collected search results to provide a unified result to an initial search request.

6. A method according to claim 5, wherein said collaborating search engine is an Internet search engine, and the method further comprises indexing information crawled from the Internet with said search engine.

7. A method according to claim 5, wherein the searching step is implemented by more than one collaborating search engine, and the method further comprises providing a respective search engine in at least one access point in the data network.

8. A method according to claim 5, wherein the step for collecting information includes substeps for detecting requested information that was inaccessible, and using information about said inaccessible information to either remove or reduce ranking of an associated entry in a search index.

9. A method according to claim 5, wherein the searching step is implemented by at least one collaborating search engine, and wherein the step for collecting information includes substeps for detecting new or updated information that has not previously been observed at an access point and using information about the new or updated information to augment a search index of said at least one collaborating search engine.

10. A method for searching and analysing the traffic content at access points in data networks, wherein the data networks are shared network resources on the Internet, wherein the method comprises:
collecting information in the form of data extracted from the information flow at said access points in the data network,
indexing said collected information,
searching said indexed information,
retrieving information based on the searching, and
collecting document identifiers for requested documents, annotating said documents identifiers with spatial information about users submitting the requests, computing access statistics for at least one document including at least the number of document requests from a spatial region and the total number of requests from said spatial region, and determining which documents are most specific for a given spatial region by comparing the access statistics for said given spatial region with the corresponding access statistics for at least a second spatial region.

11. A method according to claim 10, further comprising deriving said spatial information from user data recorded by an Internet service provider.

12. A method according to claim 10, further comprising deriving said spatial information from a location of a mobile device requesting a document.

13. A method according to claim 10, further comprising selecting a spatial granularity such that a sufficient number of users is obtained within every spatial region in order to ensure that individual users cannot be identified in the access statistics.

14. A method according to claim 10, further comprising determining a document specificity by computing a likelihood that access statistics for at least two spatial regions belongs to a same statistical distribution.

15. A method according to claim 10, further comprising determining a document specificity by using a large spatial region as the statistics for a null hypothesis and computing a statistical significance of a difference test on access statistics for a given spatial region.

16. A method according to claim 14, further comprising using a region specific scoring to provide location sensitive ranking of search results.

17. A method according to claim 15, further comprising using a region specific scoring to provide traffic dependent lists of popular region specific documents.

18. A method according to claim 17, further comprising dividing said document lists into category sublists by automatic category analysis of the document content.

19. A method for searching and analysing the traffic content at access points in data networks, wherein the data networks are shared network resources on the Internet, wherein the method comprises:
collecting information in the form of data extracted from the information flow at said access points in the data network,
indexing said collected information,
searching said indexed information, and
retrieving information based on the searching,
collecting document identifiers for the requested documents, annotating document requests such that consecutive requests from the same user can be identified, and computing a document similarity between a document "b" and a reference document "a" by comparing the number of "b" requests in the proximity of "a" requests with an average frequency of "b" requests.

20. A method according to claim 19, further comprising using the document similarity for providing a ranked list of similar documents based on any given document input.

21. A method according to claim 20, further comprising computing said ranked list by omitting documents from the same site.

22. A method according to claim 19, further comprising combining the document similarity either with a similarity measurement based on the document content or with a similarity measurement based on counting the number of co-citations.

23. A method according to claim 19, further comprising computing the document similarity for a group of document identifiers by treating all requests to one of the documents in said group as a request for a single document in the group.

24. A method according to claim 23, further comprising using a subset of a user's web log as said group of document identifiers.

25. A method according to claim 24, further comprising taking said group of document identifiers and creating personalized ranking of search results based on said document similarity.

26. A method according to claim 24, further comprising computing document ranking on the basis of link topology analysis, said document similarity being used to define a link topology and associated weights.

* * * * *